US008681298B2

(12) United States Patent
Yoshida et al.

(10) Patent No.: US 8,681,298 B2
(45) Date of Patent: Mar. 25, 2014

(54) LIQUID CRYSTAL DISPLAY DEVICE

(75) Inventors: Hiroshi Yoshida, Osaka (JP); Yasutoshi Tasaka, Osaka (JP); Yasuyoshi Kaise, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 454 days.

(21) Appl. No.: 13/057,622

(22) PCT Filed: Jul. 31, 2009

(86) PCT No.: PCT/JP2009/003640
§ 371 (c)(1),
(2), (4) Date: Feb. 4, 2011

(87) PCT Pub. No.: WO2010/016209
PCT Pub. Date: Feb. 11, 2010

(65) Prior Publication Data
US 2011/0141001 A1      Jun. 16, 2011

(30) Foreign Application Priority Data

Aug. 4, 2008  (JP) ................................ 2008-201116

(51) Int. Cl.
*G02F 1/1337*  (2006.01)
(52) U.S. Cl.
USPC .......................................... 349/129; 349/130
(58) Field of Classification Search
USPC .................................... 349/129–130
See application file for complete search history.

(56) References Cited

U.S. PATENT DOCUMENTS

| 6,833,899 B2 * | 12/2004 | Sunohara et al. ............. 349/142 |
| 6,952,252 B2 | 10/2005 | Nakanishi |
| 2003/0043336 A1 | 3/2003 | Sasaki et al. |

(Continued)

FOREIGN PATENT DOCUMENTS

| JP | 2003-287753 | 10/2003 |
| JP | 2003-330028 | 11/2003 |
| JP | 2004-004315 | 1/2004 |
| JP | 2007-072257 | 3/2007 |

OTHER PUBLICATIONS

International Preliminary Report on Patentability mailed Mar. 17, 2011 in corresponding PCT Application No. PCT/JP2009/003640.

(Continued)

*Primary Examiner* — James Dudek
(74) *Attorney, Agent, or Firm* — Nixon & Vanderhye P.C.

(57) ABSTRACT

A liquid crystal display device of a high image quality is provided in which occurrence of a leakage current between pixel electrodes is prevented. A liquid crystal display device of the present invention has a plurality of pixels 10, including a first pixel 10a and a second pixel 10b which are side by side along the first direction. The liquid crystal display device includes: a first substrate 60 which includes a first electrode 20a provided in the first pixel 10a and a second electrode 20b provided in the second pixel 10b; a second substrate 70 which is arranged so as to oppose the first substrate 60; and a liquid crystal layer 80 interposed between the first substrate 60 and the second substrate 70. The first electrode 20a includes a plurality of first branch portions 30a extending toward the second pixel 10b. The second electrode 20b includes a plurality of second branch portions 30b extending toward the first pixel 10a side. When viewed along the first direction, at least part of the end portions of the plurality of first branch portions 30a faces to a gap between end portions of two of the plurality of second branch portions 30b.

13 Claims, 9 Drawing Sheets

(56) References Cited

U.S. PATENT DOCUMENTS

| | | |
|---|---|---|
| 2003/0197819 A1 | 10/2003 | Sunohara et al. |
| 2004/0004690 A1 | 1/2004 | Yamaguchi et al. |
| 2005/0036085 A1 | 2/2005 | Sunohara et al. |
| 2007/0103607 A1 | 5/2007 | Hanaoka et al. |

OTHER PUBLICATIONS

International Search Report for PCT/JP2009/003640, mailed Sep. 1, 2009.

\* cited by examiner

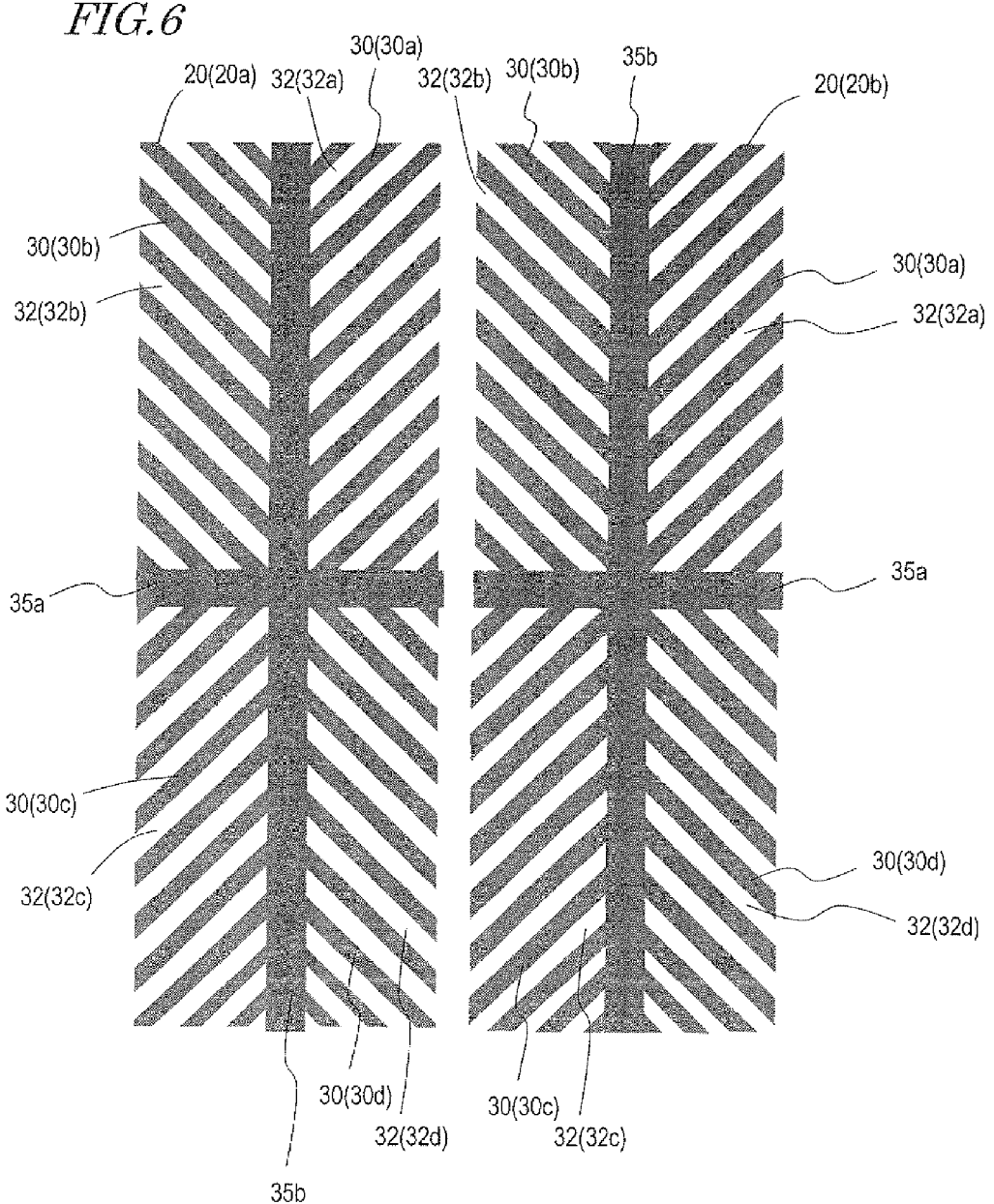

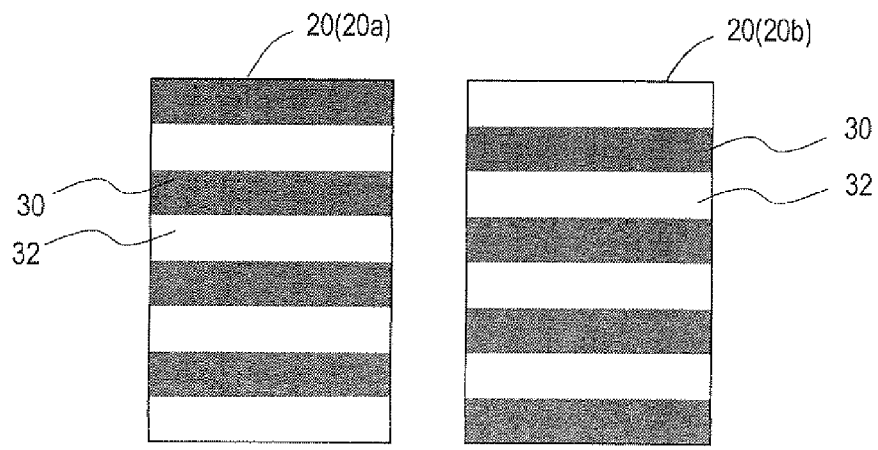
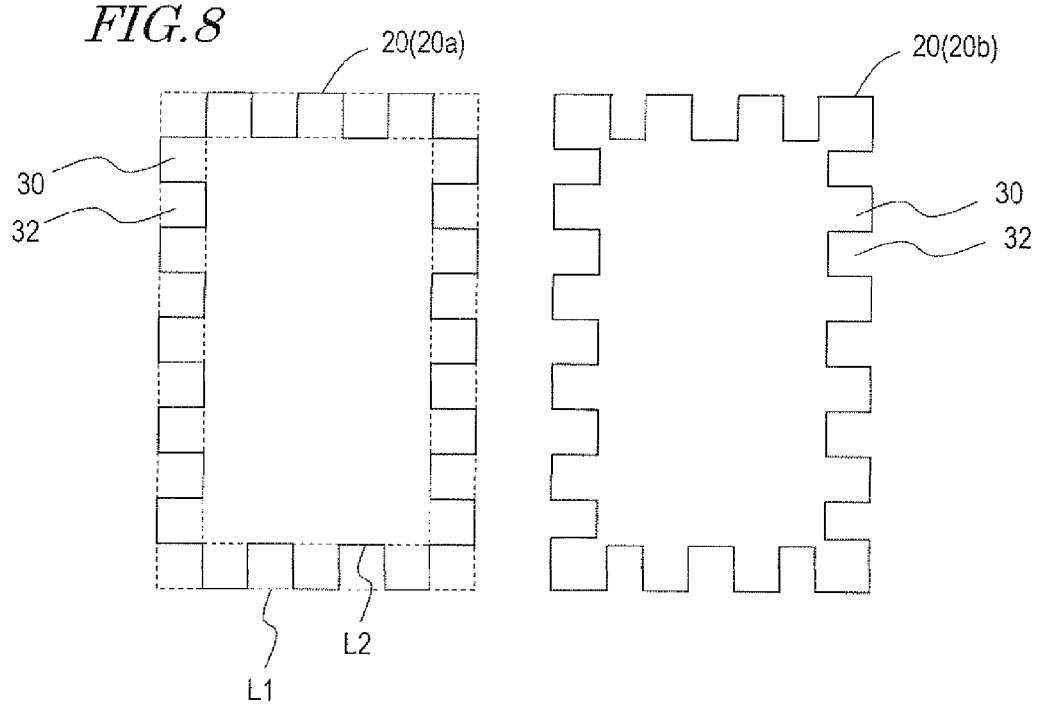

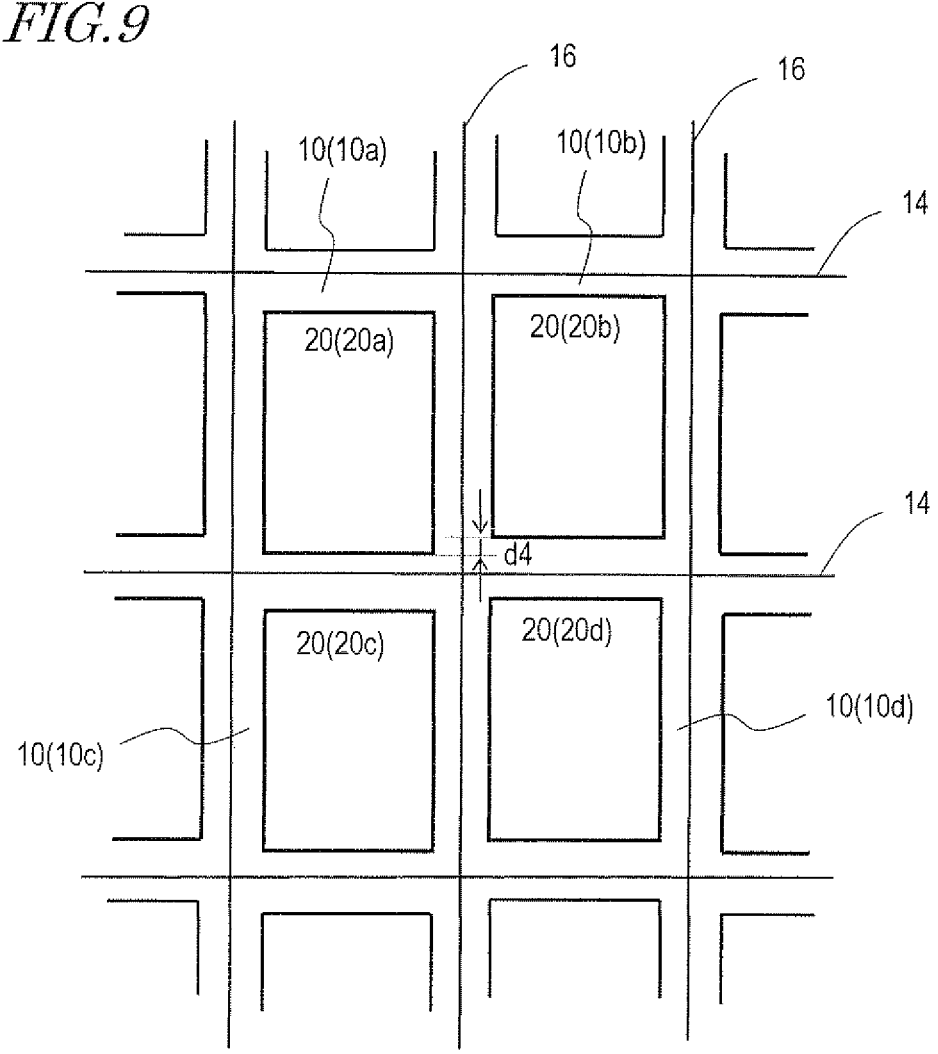

LIQUID CRYSTAL DISPLAY DEVICE

This application is the U.S. national phase of International Application No. PCT/JP2009/003640, filed 31 Jul. 2009, which designated the U.S. and claims priority to JP Application No. 2008-201116, filed 4 Aug. 2008, the entire contents of each of which are hereby incorporated by reference.

TECHNICAL FIELD

The present invention relates to a liquid crystal display device and specifically to a liquid crystal display device which has a liquid crystal alignment control structure in a pixel.

BACKGROUND ART

As of now, liquid crystal display devices under development which have wide viewing angle characteristics includes liquid crystal display devices utilizing the IPS (In-Plane-Switching) mode which is a transverse electric field mode or the EFS (Fringe Field Switching) mode, and liquid crystal display devices utilizing the VA (Vertical Alignment) mode. The VA mode is better for mass production than the transverse electric field mode and is therefore used in a wide range of TV applications and mobile applications.

The VA mode liquid crystal display devices are generally classified into MVA (Multidomain Vertical Alignment) mode liquid crystal display devices, in which one pixel includes a plurality of domains of different liquid crystal alignment directions, and CPA (Continuous Pinwheel Alignment) mode liquid crystal display devices in which the liquid crystal alignment direction continuously varies around a rivet or the like formed on an electrode at the center of a pixel.

In the MVA mode liquid crystal display devices, the alignment control means which extend in two mutually-orthogonal directions are provided to form four liquid crystal domains in one pixel, in which the azimuthal angles of the directors representing the liquid crystal domains are 45° relative to the polarization axes (transmission axes) of a pair of polarizing plates in a crossed nicols arrangement. Assuming that the direction of the polarization axis of one of the polarizing plates is azimuthal angle 0° and that the counterclockwise direction is the positive direction, the azimuthal angles of the directors of the four liquid crystal domains are 45°, 135°, 225°, and 315°. Selection of these azimuthal angles of the directors is most preferable in respect of transmittance because linearly-polarized light in the direction of 45° relative to the polarization axis is not absorbed by the polarizing plates. Such a structure which includes four domains in one pixel is referred to as "four-division alignment structure" or simply "4D structure".

The MVA mode liquid crystal display devices are not suitable to small pixels (e.g., pixels whose shorter side is less than 100 µm, especially less than 60 µm). For example, when slits (or ribs) are used as the alignment control means, the width of the slits need to be about 10 µm or more in order to obtain a sufficient alignment control force. If the slit width is narrower than this, sufficient alignment control force cannot be obtained. To form four domains, it is necessary to form, in a counter electrode, slits ("<"-shaped slit) extending in directions different by 90° from each other when seen in a direction normal to the substrate and to form, in a pixel electrode, slits which are separated by a certain space from the counter electrode slits and which extend parallel to the counter electrode slits. Specifically, both the counter electrode and the pixel electrode in one pixel need to have a plurality of slits extending in the direction of 45°-225° and the direction of 135°-315° and having the width of about 10 µm.

However, when the above-described slits are applied to pixels whose shorter side is less than 100 µm, the ratio of the area of the slits to the pixel area increases, and accordingly, part of the pixel area which fails to contribute to display increases, so that the transmittance (brightness) significantly decreases. In the case of a small-size liquid crystal display device of finer definition, e.g., 2.4-inch VGA for use in mobile phones, the pixel pitch (row direction×vertical direction) is, for example, 25.5 µm×76.5 µm. In such a small pixel, the above-described slits cannot be formed.

In the CPA mode liquid crystal display devices, a rivet is formed of a resin or the like in the counter electrode at the pixel center, such that the rivet and a diagonal electric field produced at an edge of the pixel electrode serve to regulate the alignment of the liquid crystal. Provided in the respective gaps between the two polarizing plates and the liquid crystal layer are ¼-wave plates (quarter wave plates). By utilizing omniazimuthal, radial slope alignment domains and circular polarization, high transmittance (brightness) can be achieved.

The CPA mode which utilizes the ¼-wave plates achieves high transmittance but disadvantageously provides a low contrast ratio and a narrow viewing angle as compared with the MVA mode. Specifically, when the ¼-wave plates are used, the display (especially, the display at lower gray levels (lower brightness)) appears brighter, i.e., so-called "whitish dots" are conspicuous, when observed in a diagonal viewing angle than when observed in front of the display surface (when observed in a direction normal to the display surface (viewing angle 0°)).

To solve the above problems of the liquid crystal display device in the MVA mode and the CPA mode, liquid crystal display devices as disclosed in Patent Document 1 and Patent Document 2 have been proposed. In the liquid crystal display devices of these patent documents, the four-division alignment structure is realized by forming in the pixel electrodes a large number of narrow slits extending in the direction of 45°-225° and in the direction of 135°-315° (referred to as "fishbone pixel electrode") such that the liquid crystal is aligned parallel to the slits. In liquid crystal display devices which use such fishbone pixel electrodes, large slits or rivets are not formed in pixels, and linearly-polarized light is used without using ¼-wave plates. Therefore, display can be realized with high transmittance, high contrast ratio, and wide viewing angle.

Note that the liquid crystal display devices of these patent documents include alignment sustaining layers on surfaces of the upper and lower substrates on the liquid crystal layer side for making the liquid crystal have an appropriate pretilt angle during absence of voltage application to the liquid crystal. These alignment sustaining layers are formed by polymerizing monomers contained in the liquid crystal layer during application of a voltage to the liquid crystal.

Liquid crystal display devices other than the above examples which include electrodes having slits are described in Patent Document 3, Patent Document 4, and Patent Document 5.

CITATION LIST

Patent Literature

[Patent Document 1] Japanese Laid-Open Patent Publication No. 2003-149647
[Patent Document 2] Japanese Laid-Open Patent Publication No. 2006-330638

[Patent Document 3] Japanese Laid-Open Patent Publication No. 2003-330028

[Patent Document 4] Japanese Laid-Open Patent Publication No. 2003-322868

[Patent Document 5] Japanese Laid-Open Patent Publication No. 2004-4315

SUMMARY OF INVENTION

Technical Problem

FIG. 11 is a diagram showing the shape of typical fishbone pixel electrodes. As shown in FIG. 11, a fishbone pixel electrode 120 (hereinafter, simply referred to as "pixel electrode 120") includes a plurality of branch portions ("linear electrode portions" or "line portions") 130 extending diagonally to the X direction (the left-to-right direction of the drawing) and the Y direction (the bottom-to-top direction of the drawing) which are the arrangement directions of the pixels 110. Between any adjacent two of the plurality of branch portions 130, there is a slit (linear cut) extending parallel to the branch portions 130, from an edge portion of the pixel electrode 120 to an inner portion of the pixel electrode 120.

More specifically, the pixel electrode 120 includes trunk portions 135a and 135b extending in the X direction and the Y direction, respectively, and branch portions 130a and 130c extending in the 45°-225° direction from the trunk portion 135a or 135b and branch portions 130b and 130d extending in the 135°-315° direction from the trunk portion 135a or 135b.

Among the pixels 110, the shape of the pixel electrode 120 is the same. Each pixel electrode 120 has a shape which is symmetric about an axis passing through the center of the pixel electrode 120 and extending in the X direction and an axis passing through the center of the pixel electrode 120 and extending in the Y direction. Therefore, the end portions of branch portions 130 which face each other with the intervention of a boundary area 112 between the two pixel electrodes 120 are at positions which are equal in terms of the Y direction. In other words, when viewed along the X direction, the end portions of the plurality of branch portions 130 of one of the pixel electrodes 120 and the end portions of the plurality of branch portions 130 of the other pixel electrode 120 are arranged so as to face each other with no difference in position.

In recent years, to perform display of finer definition, further increasing the density of the pixels has been demanded. To perform display with higher luminance, it is necessary to increase the size of the pixel electrode 120 and the pixel aperture as much as possible such that the effective area of the pixel can be increased. Therefore, to perform display with higher luminance or display of finer definition, it is necessary to further decrease the distance between adjacent pixel electrodes 120. However, when the distance between two adjacent pixel electrodes 120 is decreased, an unnecessary electrically-conductive material, such as the material of the pixel electrodes, may disadvantageously remain between the pixel electrodes in the production process. Thus, there is a concern that the pixel electrodes become electrically conducting due to such a conductive material, so that leakage of a pixel voltage occurs.

The present invention was conceived in order to solve the above problems. One of the objects of the present invention is to provide a liquid crystal display device in which leakage of a voltage (or a leakage current) between electrodes is less likely to occur, and which is capable of high quality display with high luminance or finer definition.

Solution to Problem

A liquid crystal display device of the present invention has a plurality of pixels which are arranged along a first direction and a second direction that is different from the first direction, the plurality of pixels including a first pixel and a second pixel which is adjacent to the first pixel along the first direction. The liquid crystal display device includes: a first substrate which includes a first electrode provided in the first pixel and a second electrode provided in the second pixel; a second substrate which is arranged so as to oppose the first substrate, the second substrate including a counter electrode; and a liquid crystal layer interposed between the first substrate and the second substrate, wherein the first electrode includes a plurality of first branch portions extending toward the second pixel, the second electrode includes a plurality of second branch portions extending toward the first pixel, and some of the plurality of first branch portions have end portions directed toward an edge of the second electrode and, when viewed along the first direction, at least part of the end portions faces to a gap (the mouth of a slit) between end portions of two of the plurality of second branch portions.

In one embodiment, some of the plurality of first branch portions have end portions directed toward an edge of the second electrode and, when viewed along the first direction, at least part of every one of the end portions faces to a gap between end portions of two of the plurality of second branch portions.

In one embodiment, some of the plurality of first branch portions have end portions directed toward an edge of the second electrode and, when viewed along the first direction, an entirety of the end portions faces to a gap between end portions of two of the plurality of second branch portions.

In one embodiment, a distance between an edge of the first electrode on the second electrode side and an edge of the second electrode on the first electrode side is not more than 5.0 μm and, when viewed along the first direction, an end portion of one of the plurality of first branch portions overlaps an end portion of one of the plurality of second branch portions, and a length of the overlap along the second direction is not more than 2.5 μm.

In one embodiment, the first electrode includes a first trunk portion extending in the first direction and a second trunk portion extending in the second direction, and the plurality of first branch portions extend from the first trunk portion or the second trunk portion.

In one embodiment, the first electrode includes a plurality of third branch portions extending from the first trunk portion or the second trunk portion in a direction away from the second pixel, and the first electrode has an asymmetric shape about the second trunk portion that is assumed as a symmetry axis.

In one embodiment, the first electrode includes a plurality of fourth branch portions extending from the first trunk portion or the second trunk portion in a direction away from the second pixel and a plurality of fifth branch portions extending from the first trunk portion or the second trunk portion toward the second pixel in a direction different from the direction that the first branch portions extend, and the first electrode has an asymmetric shape about the first trunk portion that is assumed as a symmetry axis.

In one embodiment, the liquid crystal display device is a vertical alignment type liquid crystal display device, the liquid crystal layer includes a liquid crystal of negative dielectric constant anisotropy, and when a voltage is applied across the liquid crystal layer, a plurality of domains among which an alignment direction of the liquid crystal is different are formed according to a shape of the first electrode.

In one embodiment, the plurality of first branch portions have first widths which are generally equal to one another, and a space between any adjacent two of the plurality of first branch portions is equal to the first width.

In one embodiment, the plurality of first branch portions have first widths which are generally equal to one another, and a space between any adjacent two of the plurality of first branch portions is different from the first width.

In one embodiment, a position of an edge of the first electrode in terms of the second direction and a position of an edge of the second electrode in terms of the second direction are different.

In one embodiment, the first substrate includes a source bus line extending in the second direction, and the first electrode and the second electrode are adjacent to each other with the intervention of the source bus line.

In one embodiment, the plurality of pixels include a third pixel which is adjacent to the first pixel along the second direction, the first substrate includes a third electrode which is provided in the third pixel, and position of an edge of the first electrode in terms of the first direction and a position of an edge of the third electrode in terms of the first direction are different.

In one embodiment, the first substrate includes a gate bus line extending in the first direction, and the first electrode and the third electrode are adjacent to each other with the intervention of the gate bus line.

Advantageous Effects of Invention

In a liquid crystal display device of the present invention, the end portion of a branch portion (protruding portion) of the electrode of a pixel faces to the end portion of a slit (a cut between two branch portions) of the electrode of an adjacent pixel. Therefore, even when the electrodes are placed near to each other, the distance (or area) between the nearest portions of the electrodes can be decreased. Thus, even when the pixels are arranged with a high density or arranged such that the effective area can be increased, leakage of a current between the electrodes is prevented, so that high quality display with high luminance or fine definition is possible.

BRIEF DESCRIPTION OF DRAWINGS

FIG. 6 A plan view showing the shape of the pixel electrodes 20 of the liquid crystal display device 1 of embodiment 2.

FIG. 7 A plan view schematically showing the shape of the pixel electrodes 20 of the liquid crystal display device 1 of embodiment 3.

FIG. 8 A plan view schematically showing the shape of the pixel electrodes 20 of the liquid crystal display device 1 of embodiment 4.

FIG. 9 A plan view schematically showing an arrangement of the pixel electrodes 20 of the liquid crystal display device 1 of embodiment 5.

DESCRIPTION OF EMBODIMENTS

Hereinafter, the structure of a liquid crystal display device of an embodiment of the present invention is described with reference to the drawings. Note that, however, the present invention is not limited to embodiments which will be described below.

Embodiment 1

Figure 1:
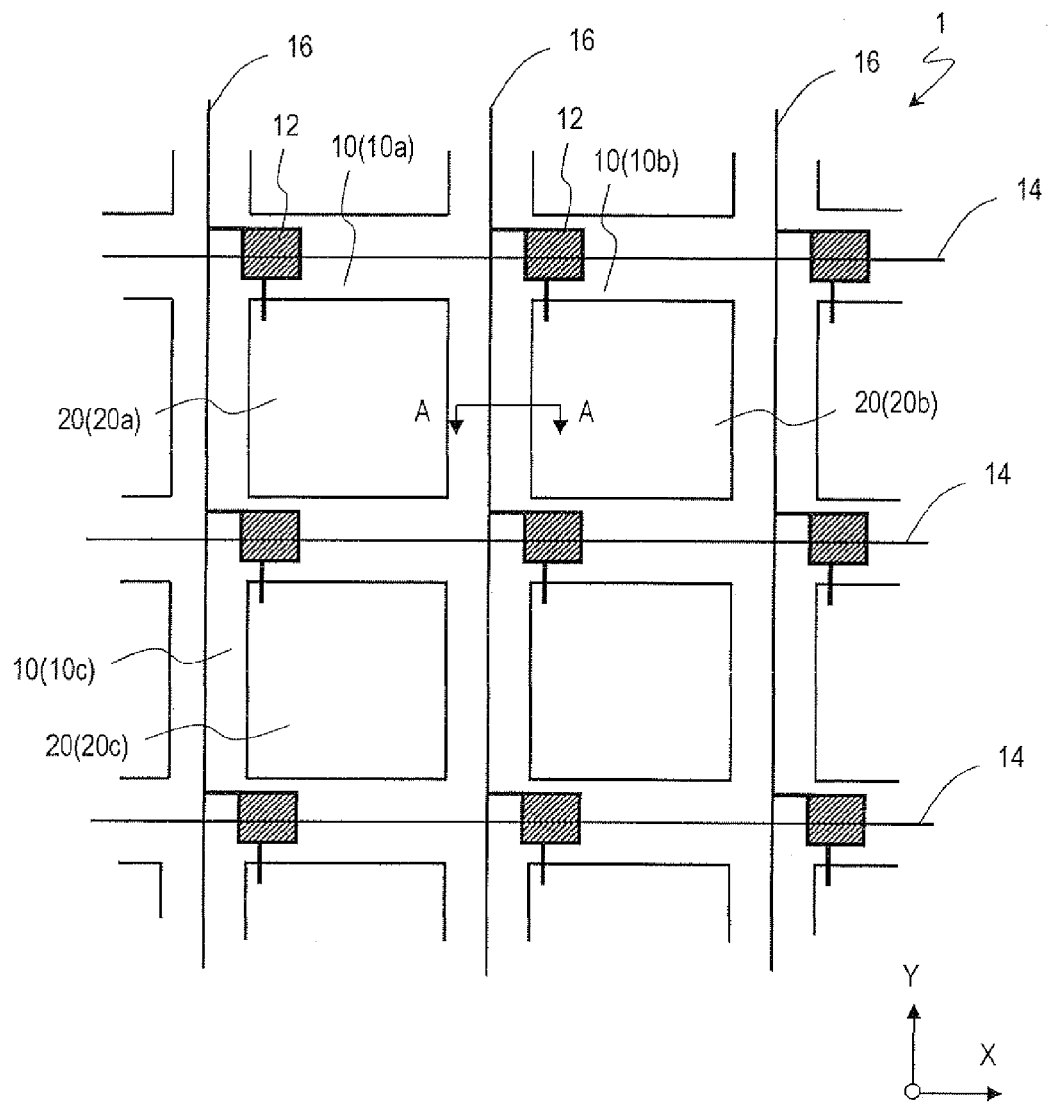
FIG. 1 A plan view schematically showing the structure of a liquid crystal display device 1 of an embodiment of the present invention.
Figure 2:
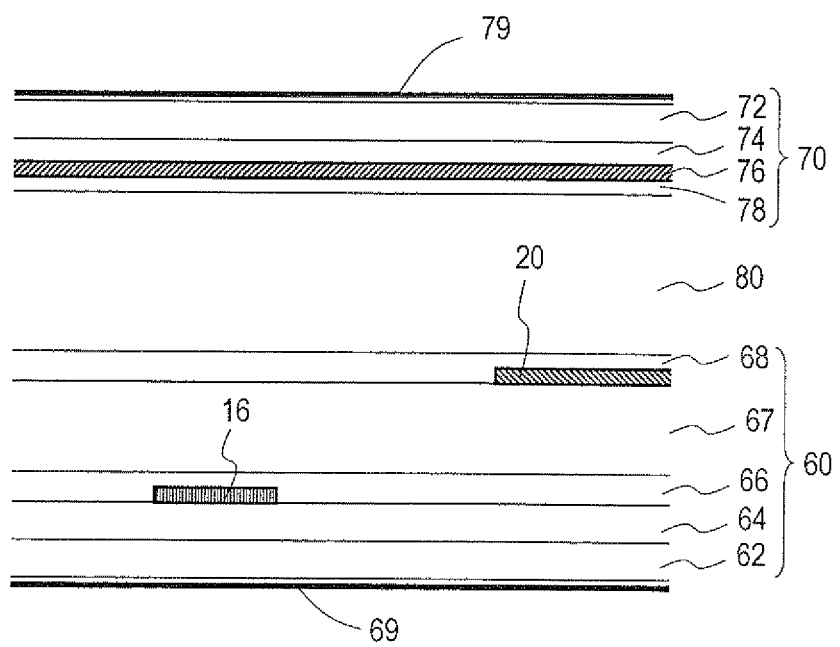
FIG. 2 A schematic cross-sectional view of the liquid crystal display device 1 taken along line A-A of FIG. 1.

FIG. 1 is a plan view schematically showing the structure of a liquid crystal display device 1 of the first embodiment of the present invention. FIG. 2 is a schematic cross-sectional view of the liquid crystal display device 1 taken along line A-A of FIG. 1. Note that, in FIG. 1, the shape of pixel electrodes 20 is simply represented by a square. A specific shape of the pixel electrodes 20 will be described later with reference to FIG. 3 and other relevant figures.

The liquid crystal display device 1 is a vertical alignment type (VA type) liquid crystal display device which performs display in a normally-black mode using a plurality of pixels 10 arranged in a display region as shown in FIG. 1. The plurality of pixels 10 are in a matrix arrangement along the X direction (the left-to-right direction of the drawing) and the Y direction (the bottom-to-top direction of the drawing). The liquid crystal display device 1 includes, as shown in FIG. 2, a TFT substrate 60 which is an active matrix substrate, a counter substrate 70 which is a color filter substrate, and a liquid crystal layer 80 interposed between these substrates. The liquid crystal layer 80 includes nematic liquid crystal which has negative dielectric constant anisotropy ($\Delta\varepsilon<0$).

The outer side surface of the TFT substrate 60 (opposite to the liquid crystal layer 80) is provided with a polarizing plate 69. The outer side surface of the counter substrate 70 is provided with a polarizing plate 79. The polarizing plates 69 and 79 are in a crossed nicols arrangement such that the light transmission axis of one of the polarizing plates extends in the X direction, and the light transmission axis of the other extends in the Y direction. In the description below, the azimuthal direction from left to right in FIG. 1 is referred to as "azimuthal direction 0°", relative to which the azimuthal angles are allocated counterclockwise.

As shown in FIG. 1 and FIG. 2, the TFT substrate 60 includes a transparent substrate 62, such as a glass substrate, a gate insulation layer 64 provided on the transparent substrate 62 (on the liquid crystal layer 80 side), an insulation layer (PAS layer) 66 provided on the gate insulation layer 64, and a resin layer (JAS layer) 67 provided on the insulation layer 66. The resin layer 67 functions as an insulation layer. Between the transparent substrate 62 and the gate insulation layer 64, scanning lines (gate bus lines) 14 and unshown storage capacitor lines (Cs lines) are interposed. Between the gate insulation layer 64 and the insulation layer 66, TFTs 12 and signal lines (data bus lines or source bus lines) 16 are interposed. Over the resin layer 67, the pixel electrodes 20 are provided, and an alignment film 68 is provided so as to cover the pixel electrodes 20.

Each of the pixels 10 is surrounded by two adjacent scanning lines 14 and two adjacent signal lines 16. Every one of the pixels 10 has the pixel electrode 20 and the TFT 12 for switching the display voltage that is to be supplied to the pixel electrode 20. The gate electrode, the source electrode, and the drain electrode of the TFT 12 are electrically coupled to the scan line 14, the signal line 16, and the pixel electrode 20, respectively. The gate electrode is supplied with a gate signal of the TFT 12 from the scan line 14. The pixel electrode 20 is supplied with a display signal from the signal line 16 via the TFT 12.

The counter substrate 70 includes a transparent substrate 72, a color filter (CF) layer 74 arranged on the transparent substrate 72 (on the liquid crystal layer 80 side), a counter electrode (common electrode) 76 provided on the color filter layer 74, and an alignment film 78 provided on the counter electrode 76.

Each of the alignment film 68 of the TFT substrate 60 and the alignment film 78 of the counter substrate 70 may include an alignment layer and an alignment sustaining layer formed by a polymer structure. The alignment layer is a vertical alignment film formed over the substrate by application. The alignment sustaining layers may be formed, after formation of a liquid crystal cell, by photopolymerizing photopolymerizable monomers contained beforehand in a liquid crystal material while a voltage is applied across the liquid crystal layer 80. In this process, oblique electric fields produced by application of the voltage according to the shape of the pixel electrodes 20 define the alignment of liquid crystal molecules, and the cell is irradiated with light such that the monomers are polymerized while the defined alignment of the liquid crystal molecules is maintained.

The thus formed alignment sustaining layers have a function as an alignment control structure. These alignment sustaining layers enable the liquid crystal molecules to sustain (memorize) some orientations (pretilt azimuths) even after removal of the voltage (in the absence of an applied voltage). Such an alignment film formation technique is called PSA (Polymer Sustained Alignment) technique.

Figure 3:
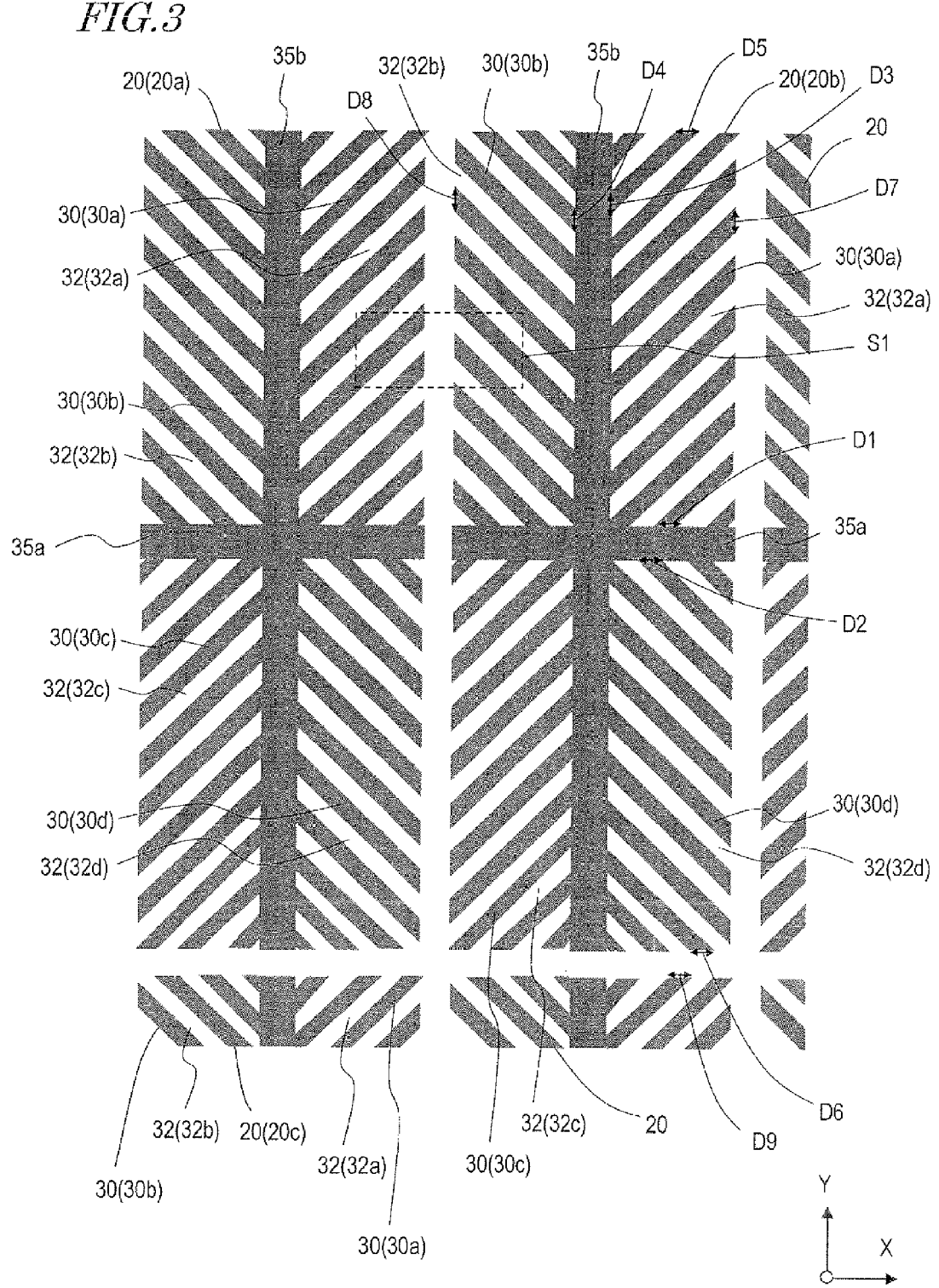
FIG. 3 A plan view showing the shape of pixel electrodes 20 of the liquid crystal display device 1 of embodiment 1.
Figure 4:
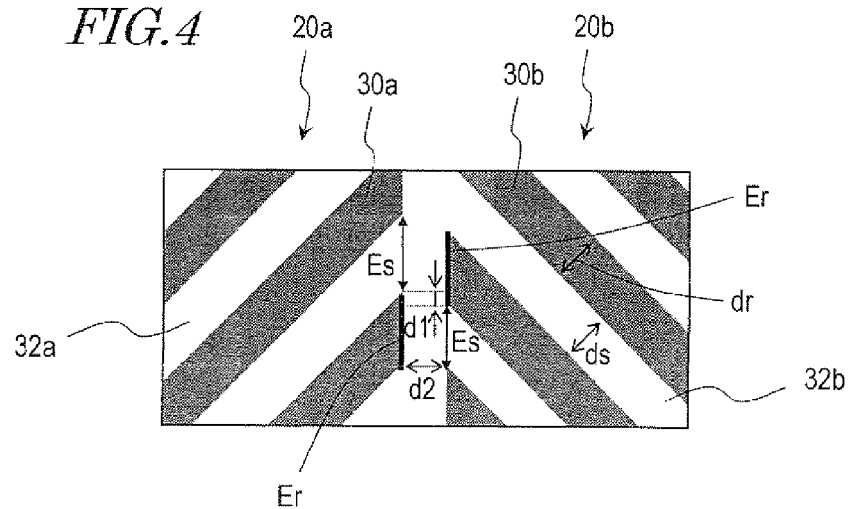
FIG. 4 An enlarged view of the shape of two adjacent pixel electrodes 20, showing a portion in the vicinity of the boundary between the electrodes 20.

Next, the shape of the pixel electrodes 20 of the liquid crystal display device 1 is described with reference to FIG. 3 and FIG. 4. FIG. 3 is a schematic diagram mainly illustrating the shape of the pixel electrodes 20a and 20b of two of the plurality of pixels 10 shown in FIG. 1, pixels 10a and 10b, which are side by side along the X direction with the intervention of the signal line 16. FIG. 4 is an enlarged view of a boundary portion S1 extending between the pixel electrodes 20a and 20b shown in FIG. 3. In embodiment 1, all the pixel electrodes 20 have the same shape.

As shown in FIG. 3, each of the pixel electrodes 20 includes a trunk portion 35a extending in the direction of azimuthal angle 0°-180° ("X direction" or "first direction"), a trunk portion 35b extending in the direction of azimuthal angle 90°-270° ("Y direction" or "second direction"), and a plurality of branch portions 30 extending diagonally to these directions. The plurality of branch portions 30 include a plurality of branch portions 30a and a plurality of branch portions 30c extending in the direction of azimuthal angle 45°-225° and a plurality of branch portions 30b and a plurality of branch portions 30d extending in the direction of azimuthal angle 135°-315°. The branch portions 30a, 30b, 30c, and 30d branch off from the trunk portion 35a or 35b and extend in the directions of azimuthal angles 45°, 135°, 225°, and 315°.

Between any adjacent two of the plurality of branch portions 30a, there is a slit (linear cut) 32 extending parallel to the branch portions 30, from an edge portion of the pixel electrode 20 to an inner portion of the pixel electrode 20. More specifically, there are a slit 32a provided between any adjacent two of the plurality of branch portions 30a, a slit 32b provided between any adjacent two of the plurality of branch portions 30b, a slit 32c provided between any adjacent two of the plurality of branch portions 30c, and a slit 32d provided between any adjacent two of the plurality of branch portions 30d.

The width of each branch portion 30 (the dimension perpendicular to the direction of extension of the branch portion 30: dr in FIG. 4) is 3.0 μm. The width of each slit 32 (the dimension perpendicular to the direction of extension of the slit 32: ds in FIG. 4) is also 3.0 μm. As the width of the branch portion 30 and the width of the slit 32 decrease, the liquid crystal is more readily aligned along the branch portion 30, so that brighter display can be obtained. Therefore, the width of the branch portion 30 and the width of the slit 32 are preferably not more than 3.5 μm. More preferably, the width of the branch portion 30 and the width of the slit 32 are not less than 1.0 μm and not more than 3.5 μm. Note that the widths dr of the respective branch portions 30 are substantially equal, and the widths ds of the respective slits are also substantially equal. The width dr of the branch portion 30 and the width ds of the slit may be substantially equal to each other or may be different from each other.

By the pixel electrode 20 having the above-described shape and the alignment films 68 and 78, a multidomain of 4D structure is formed in each of the pixels 10. When no voltage is applied, the pretilt azimuths of the liquid crystal molecules in the four domains are parallel to the branch portions 30a, 30b, 30c, and 30d in accordance with the azimuths memorized in the alignment films 68 and 78. When a voltage is applied, the liquid crystal molecules of the four domains are oriented in polar angle directions whose azimuthal directions are parallel to the branch portions 30a, 30b, 30c, and 30d (the azimuths of the directors of the domains) and which are more parallel to the substrate surface. In this case, the azimuths of the orientation are coincident with the azimuths of the pretilt, and therefore, the orientation in correct azimuths with an extremely high response rate is realized.

Hereinafter, the shape of the pixel electrodes 20 is described more specifically.

The shape of the pixel electrode 20 is asymmetric about the trunk portion 35a that is assumed as the symmetry axis and is also asymmetric about the trunk portion 35b that is assumed as the symmetry axis. Specifically, the positions of connecting portions of the branch portion 30a and the branch portion 30d with the trunk portion 35a (D1 and D2 in FIG. 3) are different in terms of the X direction. Also, the positions of connecting portions of the branch portion 30b and the branch portion 30c with the trunk portion 35a are different in terms of the X direction. Meanwhile, the positions of connecting portions of the branch portion 30a and the branch portion 30b with the trunk portion 35b (D3 and D4 in FIG. 3) are different in terms of the Y direction. Also, the positions of connecting portions of the branch portion 30c and the branch portion 30d with the trunk portion 35b are different in terms of the Y direction.

Thus, the positions of the end portions of the branch portion 30a and the branch portion 30d (D5 or D9, and D6) are different in terms of the X direction. Also, the positions of the end portions of the branch portion 30b and the branch portion 30c are different in terms of the X direction. Meanwhile, the positions of the end portions of the branch portion 30a and the branch portion 30b (D7 and D8) are different in terms of the Y direction. Also, the positions of the end portions of the branch portion 30c and the branch portion 30d are different in terms of the Y direction.

The branch portions 30a and 30d of the pixel electrode 20a extend from an inner portion of the pixel electrode 20a toward the pixel electrode 20b. The branch portions 30b and 30c of the pixel electrode 20b extend from an inner portion of the pixel electrode 20b toward the pixel electrode 20a. When viewed along the X direction, part of the end portion Er of the branch portion 30a of the pixel electrode 20a faces to the mouth Es of the slit 32b of the pixel electrode 20b (the gap between the end portions of two branch portions 30), while the other part faces to the end portion Er of the branch portion 30b of the pixel electrode 20b. Likewise, when viewed along the X direction, part of the end portion Er of the branch portion 30d of the pixel electrode 20a faces to the mouth Es of the slit 32c of the pixel electrode 20b, while the other part faces to the end portion Er of the branch portion 30c of the pixel electrode 20b. The lengths of Er and Es (lengths along the Y direction) are preferably not more than 5.0 μm and not less than 1.5 μm.

As described above, according to the present embodiment, the positions of the end portions of the branch portions 30 of adjacent pixel electrodes 20 are different in terms of the Y direction. When viewed along the X direction, the end portions of the branch portions 30 of adjacent pixel electrodes 20 and the mouths of the slits 32 face each other. Therefore, the distance (or area) between branch portions 30 which face each other is smaller than in the pixel electrodes 120 shown in FIG. 11. Therefore, occurrence of a leakage current between the pixel electrodes is prevented, so that the potential of the pixel voltage can be stably maintained at a desired potential.

Some of the branch portions 30a and 30d of the pixel electrode 20a have end portions directed toward the left edge of the pixel electrode 20b. It is preferred that, when viewed along the X direction, at least part of every one of the end portions of these branch portions 30a and 30d faces to the mouth of a corresponding one of the slits 32b and 32c of the pixel electrode 20b. This arrangement can effectively prevent occurrence of a leakage current between the pixel electrodes. However, at least part of at least one of the end portions of the branch portions 30a and 30d of the pixel electrode 20a may face to the mouth of the slit 32b or 32c of the pixel electrode 20b. This arrangement can also achieve the effect of reducing occurrence of a leakage current to some extent.

The distance between the pixel electrodes 20a and 20b, i.e., the distance along the X direction between the end portion of the branch portion 30a of the pixel electrode 20a and the end portion of the branch portion 30b of the pixel electrode 20b, d2 in FIG. 4, is preferably not more than 5.0 μm. Preferably, the length along the Y direction of an overlapping part of the end portion of the branch portion 30a of the pixel electrode 20a and the end portion of the branch portion 30b of the pixel electrode 20b which overlap each other when viewed along the X direction, d1 in FIG. 4, is not more than 2.5 μm. By employing such distances for d1 and d2, high density arrangement of the pixels 10 and prevention of occurrence of a leakage current between the pixel electrodes can be realized. Note that d1 may be considered as the distance along the Y direction between the upper corner of the end portion of the branch portion 30a of the pixel electrode 20a and the lower corner of the end portion of the branch portion 30b of the pixel electrode 20b which is adjacent to the branch portion 30a. To reduce the leakage current so as to be equal to or smaller than half of that which would occur in the conventional structure, d2 is preferably not more than 2.5 μm.

FIGS. 5(a) and 5(b) respectively show the first and second variations of the pixel electrode 20 of embodiment 1, corresponding to the region S1 of FIG. 3.

As shown in FIG. 5(a), in the pixel electrode 20 of the first variation, the slit 32 has the width ds which is larger than the width dr of the branch portion 30. When viewed along the X direction, the entirety of the end portion Er of the branch portion 30a of the pixel electrode 20a faces to the mouth Es of the slit 32b of the pixel electrode 20b. This also applies to the relationship between the branch portion 30d of the pixel electrode 20a and the slit 32c of the pixel electrode 20b.

Figure 11:
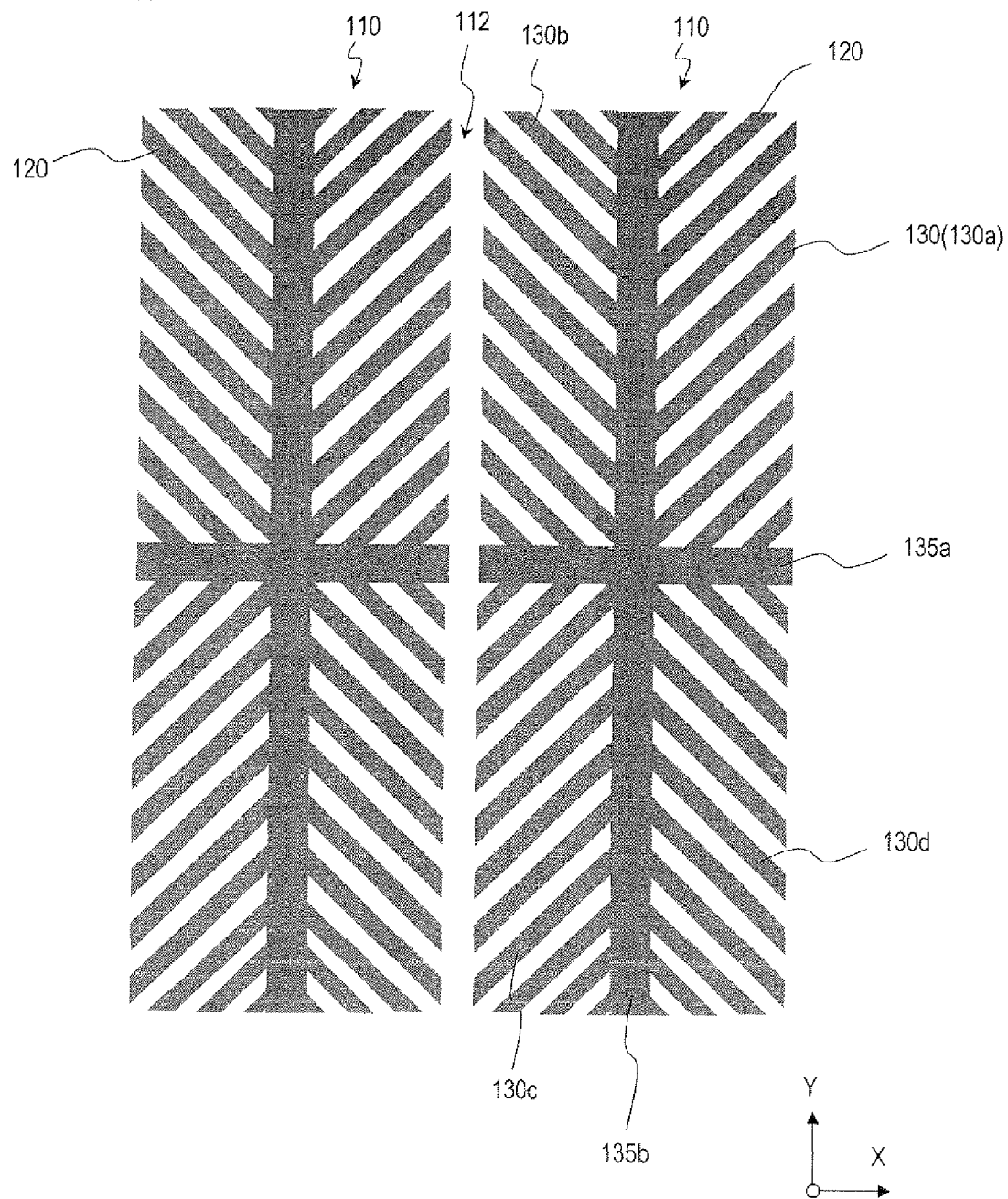
FIG. 11 A plan view schematically showing the shape of pixel electrodes 120 of a conventional liquid crystal display device.

When the pixel electrodes 20 have such a shape, the distance between adjacent pixel electrodes 20 is larger than in the pixel electrodes 120 shown in FIG. 11 and the pixel electrodes 20 shown in FIG. 4. Therefore, occurrence of a leakage current can be more readily prevented.

The pixel electrode 20 of the second variation shown in FIG. 5(b) is different from the configuration shown in FIG. 3 in the shape of the end portion of the branch portion 30. In this example, the end portion of the branch portion 30 has an edge which is perpendicular to the direction of extension of the branch portion 30. Another variation is possible in which the end portion of the branch portion 30 has an edge which is not perpendicular to the direction of extension of the branch portion 30.

In such a variation, the distance along the Y direction between the upper corner of the end portion of the branch portion 30a of the pixel electrode 20a and the lower corner of the end portion of the branch portion 30b of the pixel electrode 20b which is adjacent to the branch portion 30a, d1, is preferably not more than 2.5 μm. The shortest distance between the end portions of the branch portion 30a of the pixel electrode 20a and the branch portion 30b of the pixel electrode 20b which is adjacent to the branch portion 30a, d2, is preferably not more than 5.0 μm.

In the second variation, the distance between the corners of adjacent branch portions 30a and 30b, d3 in FIG. 5(b), is larger than in the conventional pixel electrodes. Therefore, a leakage current between the pixel electrodes can be prevented. Note that such a shape of the end portion of the branch portion 30 is applicable to embodiments which will be described below.

Figure 5:
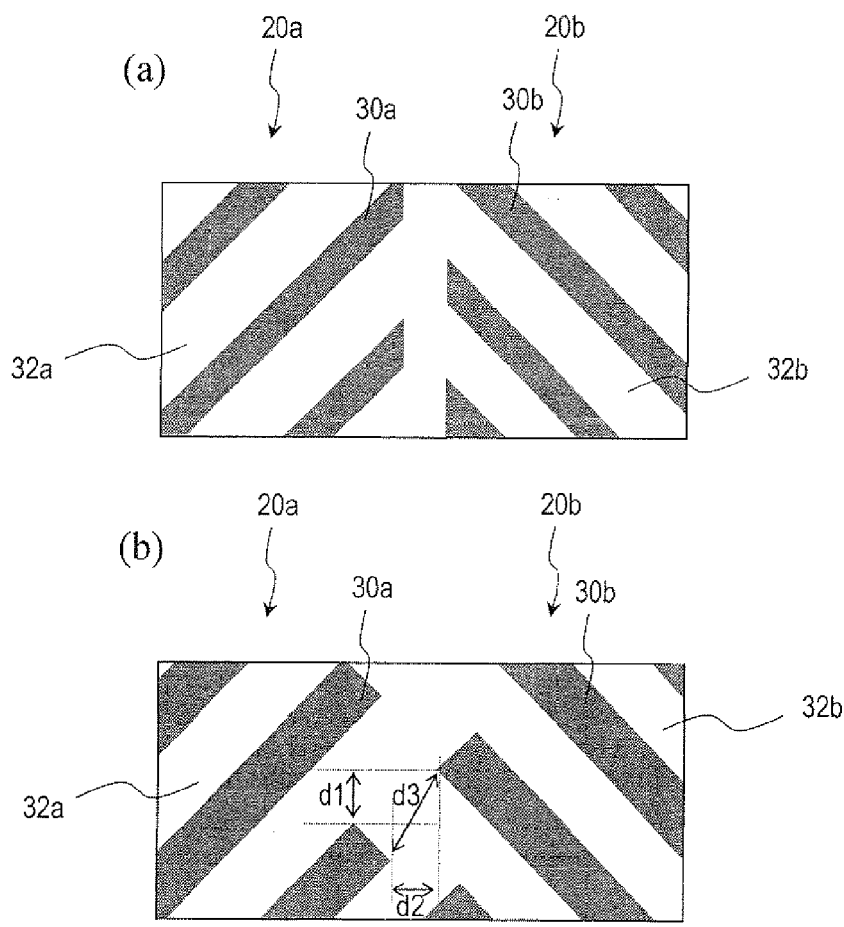
FIGS. 5 (a) and (b) are variations of the shape of pixel electrodes 20, showing a portion in the vicinity of their boundary.

In the liquid crystal display device 1 of embodiment 1, as shown in FIG. 1 and FIG. 3, a pixel 10c, which is adjacent to the pixel 10a along the Y direction with the intervention of the scan line 14, includes a pixel electrode 20c which have the same shape as the pixel electrodes 20a and 20b. The relationship between the branch portion 30c of the pixel electrode 20a and the branch portion 30b of the pixel electrode 20c and the relationship between the branch portion 30d of the pixel electrode 20a and the branch portion 30a of the pixel electrode 20c are equivalent to the relationship between the branch portions 30 of the pixel electrodes 20a and 20b as shown in FIG. 4 and FIG. 5. The end portions of the branch portions are arranged at positions which are different when viewed along the Y direction, without being at the same position. Thus, occurrence of a leakage current between the pixel electrodes 20a and 20c is also prevented.

Embodiment 2

Next, a liquid crystal display device of the second embodiment of the present invention is described.

The liquid crystal display device of embodiment 2 is different from the liquid crystal display device 1 of embodiment 1 in that the pixel electrode 20 is replaced by another pixel electrode 20 of a different fishbone shape, and the other elements are basically the same as those of embodiment 1. Therefore, only the shape of the pixel electrode 20 is described below.

FIG. 6 is a plan view schematically showing the shape of the pixel electrodes 20a and 20b of two adjacent ones of the plurality of pixels 10 arranged in the liquid crystal display device of embodiment 2 (the pixels 10a and 10b of FIG. 1). As shown in FIG. 6, in embodiment 2, each of the pixel electrode 20a and the pixel electrode 20b has a symmetric shape about the central axes of the trunk portion 35a and the trunk portion 35b. The shapes of the pixel electrodes 20a and 20b are different from each other such that the shape of the pixel electrode 20a is equal to that obtained by replacing the branch portions 30 and the slits 32 with each other in the pixel electrode 20b. In the liquid crystal display device of embodiment 2, the pixel electrodes 20 of any adjacent two pixels 10 which are side by side along the X direction or the Y direction have such different shapes of the pixel electrodes 20a and 20b.

Thus, when viewed along the X direction, the end portions of the branch portions 30a and 30d of the pixel electrode 20a respectively face to the mouths of the slits 32b and 32c of the pixel electrode 20b. Meanwhile, although not shown in FIG. 6, a pixel electrode 20 of a pixel 10 which is adjacent to the pixel 10a along the Y direction also has the same shape as that of the pixel electrode 20b. Thus, when viewed along the Y direction, the end portions of the branch portions 30a and 30b of the pixel electrode 20a face to the mouths of the slits 32d and 32c of another pixel electrode 20 which is adjacent to the pixel electrode 20a along the Y direction. By employing the pixel electrodes 20 of such shapes, occurrence of a leakage current between the pixel electrodes can effectively be prevented as in embodiment 1.

The width of the branch portion 30 or the slit 32 in one of the pixel electrodes 20 may be changed such that part of the end portion of the branch portion 30 of the pixel electrode 20a faces to the mouth of the slit 32 of the pixel electrode 20b while the other part faces to the end portion of the branch portion 30 of the pixel electrode 20b. This arrangement can also achieve the effect of reducing occurrence of a leakage current.

Embodiment 3

Next, a liquid crystal display device of the third embodiment of the present invention is described.

The liquid crystal display device of embodiment 3 is different from the liquid crystal display device 1 of embodiment 1 in that the pixel electrode 20 is replaced by a different pixel electrode 20 which has a shape as shown in FIG. 7, and the other elements are basically the same as those of embodiment 1. Therefore, only the shape of the pixel electrode 20 is described below.

FIG. 7 is a plan view schematically showing the shape of the pixel electrodes 20a and 20b of any two of the plurality of pixels 10 of the liquid crystal display device of embodiment 3 which are side by side along the X direction (corresponding to the pixels 10a and 10b of FIG. 1). As shown in FIG. 7, in embodiment 3, each of the pixel electrode 20a and the pixel electrode 20b includes a plurality of branch portions 30 extending in the X direction and a plurality of slits 32 each of which is interposed between adjacent two of the plurality of branch portions 30. Note that, however, the position of the branch portion 30 of the pixel electrode 20a in terms of the Y direction is different from the position of the branch portion 30 of the pixel electrode 20b in terms of the Y direction. The end portion of the branch portion 30 of the pixel electrode 20a faces to the mouth of a slit of the pixel electrode 20b. This arrangement can effectively prevent occurrence of a leakage current between the pixel electrodes.

Note that, in each of the pixel electrodes 20a and 20b, the plurality of branch portions 30 are electrically coupled by an unshown connector. The connector is provided in part of the pixel electrode 20 excluding the perimeter portion, preferably about the middle of the pixel electrode in terms of the X direction. The plurality of branch portions 30 may be electrically coupled via a contact hole formed in an underlying insulation layer.

The width of the branch portion 30 or the slit 32 in one of the pixel electrodes 20 may be changed such that part of the end portion of the branch portion 30 of the pixel electrode 20a faces to the mouth of the slit 32 of the pixel electrode 20b while the other part faces to the end portion of the branch portion 30 of the pixel electrode 20b. This arrangement can also achieve the effect of reducing occurrence of a leakage current.

Although, in the embodiment shown in FIG. 7 branch portions 30 of the pixel electrode 20a and the pixel electrode 20b extend in the X direction, the branch portions 30 may extend in the Y direction. In this case, the pixel electrode 20a and the pixel electrode 20b are side by side along the Y direction and, when viewed along the Y direction, the end portion of the branch portion 30 of the pixel electrode 20a faces to the mouth of the slit of the pixel electrode 20b.

Embodiment 4

Next, a liquid crystal display device of the fourth embodiment of the present invention is described.

The liquid crystal display device of embodiment 4 is different from the liquid crystal display device 1 of embodiment 1 in that the pixel electrode 20 is replaced by a different pixel electrode 20 which has a shape as shown in FIG. 8, and the other elements are basically the same as those of embodiment 1. Therefore, only the shape of the pixel electrode 20 is described below.

FIG. 8 is a plan view schematically showing the shape of the pixel electrodes 20a and 20b of any two of the plurality of pixels 10 of the liquid crystal display device of embodiment 4 which are side by side along the X direction (corresponding to the pixels 10a and 10b of FIG. 1). As shown in FIG. 8, in embodiment 4, each of the pixel electrode 20a and the pixel electrode 20b includes a plurality of slits 32, each of which is cut into the electrode along the X direction or the Y direction from the edges of the electrode. Part of the electrode which is interposed between adjacent two of the plurality of slits 32 forms a branch portion 30 of the pixel electrode 20.

In the vicinity of the boundary between the pixel electrode 20a and the pixel electrode 20b, the position of the branch portion 30 of the pixel electrode 20a in terms of the Y direction is different from the position of the branch portion 30 of the pixel electrode 20b in terms of the Y direction. The end portion of the branch portion 30 of the pixel electrode 20a faces to the mouth of the slit of the pixel electrode 20b. This arrangement can effectively prevent occurrence of a leakage current between the pixel electrodes. In this arrangement, the ratio of the area of the pixel electrode which does not include the branch portions 30 and the slits 32 (the area enclosed by broken line L2 in FIG. 8) to the area of a pixel electrode region which includes the slits 32 (the area enclosed by broken line L1 in FIG. 8) is preferably 50% or higher. When a pixel electrode which does not include the branch portion 30 or the slit 32, disturbance would occur in the alignment of the liquid crystal due to the effects of the bus line potential, for example.

However, by employing the above-described structure of the present embodiment, the effects of the bus line potential can be decreased so that the alignment of the liquid crystal can be stabilized.

Although not shown, the neighboring pixels 10 at the top and the bottom of the pixel electrode 20a include pixel electrodes 20 which have the same shape as that of the pixel electrode 20b. In the vicinity of the borders with the neighboring pixel electrodes 20 at the top and the bottom, the position of the branch portion 30 of the pixel electrode 20a in terms of the X direction is different from the positions of the branch portions 30 of the neighboring pixel electrodes 20 at the top and the bottom in terms of the X direction. The end portions of the branch portions 30 of the pixel electrode 20a face to the mouths of the slits of the neighboring pixel electrodes 20 at the top and the bottom. This arrangement can effectively prevent occurrence of a leakage current between the pixel electrodes.

The width of the branch portion 30 or the slit 32 in one of the pixel electrodes 20 may be changed such that part of the end portions of the branch portions 30 of the pixel electrode 20a faces to the mouths of the slits 32 of the neighboring pixel electrodes 20 on the top side and the bottom side and on the right side and the left side while the other part faces to the end portions of the branch portions 30 of the neighboring pixel electrodes 20. This arrangement can also prevent occurrence of a leakage current.

Embodiment 5

Next, a liquid crystal display device of the fifth embodiment of the present invention is described. The liquid crystal display device of embodiment 5 is different from the liquid crystal display device 1 of embodiment 1 in that the arrangement of the plurality of pixel electrodes 20 is replaced by a different arrangement as shown in FIG. 9. The pixel electrodes 20 have substantially equal shapes. The shape of each of the pixel electrodes 20 may be the same as any of the pixel electrodes 20a or any of the pixel electrodes 20b of embodiments 1 to 4. The other elements are basically the same as those of embodiment 1. Therefore, only the arrangement pattern of the pixel electrodes 20 is described below.

FIG. 9 is a plan view showing an arrangement of the pixel electrodes 20 in a liquid crystal display device of embodiment 5. The pixels 10a to 10d shown in FIG. 9 represent four pixels 10 which are adjacent to one another in the liquid crystal display device of embodiment 5. The pixels 10a to 10d include pixel electrodes 20a to 20d, respectively.

As shown in FIG. 9, the pixel electrodes 20a and 20b which are side by side along the X direction are arranged such that the positions of their edges in terms of the Y direction (the position of the upper edge and the position of the lower edge) are different by distance d4. Likewise, the pixel electrodes 20c and 20d which are side by side along the X direction are arranged such that the positions of their edges in terms of the Y direction are different by distance d4. Here, the length of the end portion of the branch portion 30 of the pixel electrode 20 along the Y direction (for example, length Er in FIG. 4) is preferably not more than 5.0 μm and not less than 1.5 μm. The length of the end portion of the slit 32 along the Y direction (for example, length Es in FIG. 4) is preferably not more than 5.0 μm and not less than 1.5 μm. It is also preferred that distance d4 is approximately equal to length Er or length Es (not more than 5.0 μm and not less than 1.5 μm).

In this way, by arranging two pixel electrodes 20 which are side by side along the X direction such that the positions of their edges in terms of the Y direction are different, the end portions of the branch portions 30 of the pixel electrodes 20a and 20c face to the mouths of the slits 32 of the pixel electrodes 20b and 20d in the vicinity of the boundary between these pixel electrodes. This arrangement can effectively prevent occurrence of a leakage current between the pixel electrodes. Note that, in the present embodiment, two pixel electrodes which are side by side along the Y direction (e.g., 20a and 20c) are arranged such that the positions of their edges in terms of the X direction are equal, although the edge positions of these pixel electrodes in terms of the X direction may be different.

Embodiment 6

Figure 10:
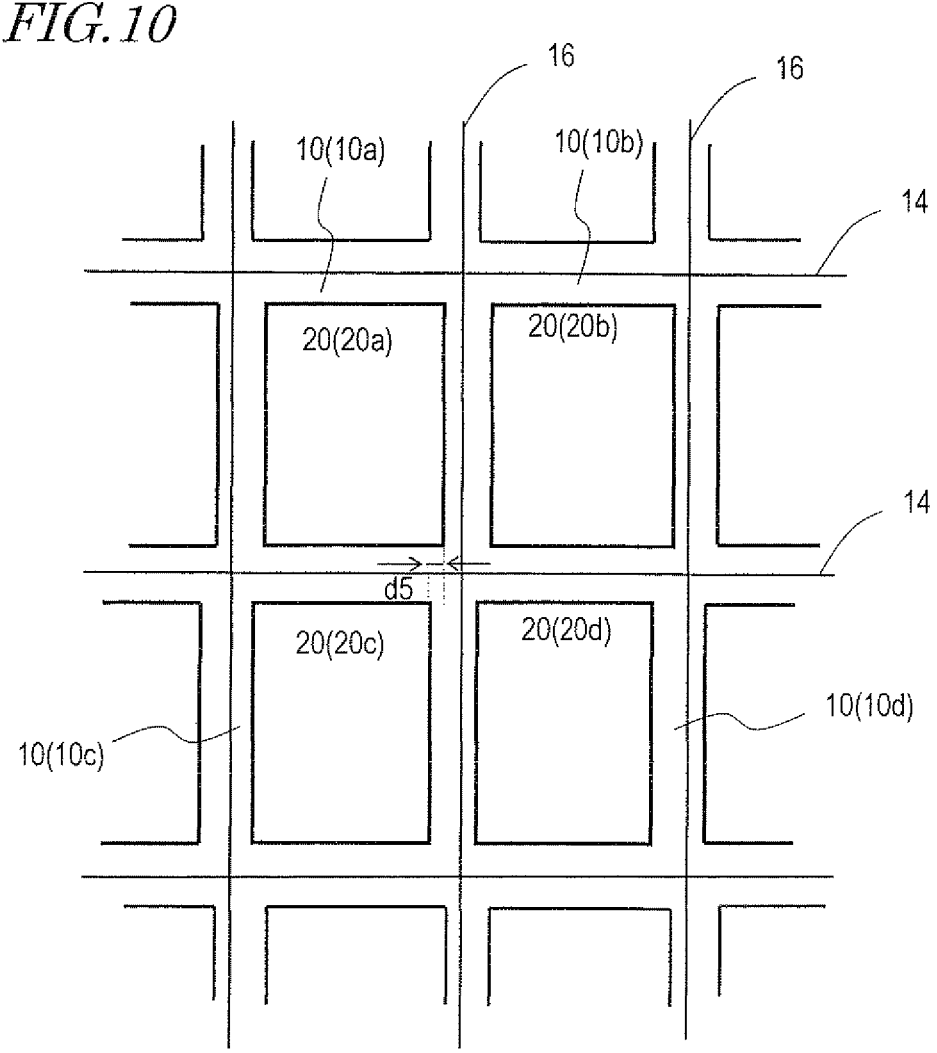
FIG. 10 A plan view schematically showing an arrangement of the pixel electrodes 20 of the liquid crystal display device 1 of embodiment 6.

Next, a liquid crystal display device of the sixth embodiment of the present invention is described. The liquid crystal display device of embodiment 6 is different from the liquid crystal display device 1 of embodiment 1 in that the arrangement of the plurality of pixel electrodes 20 is replaced by a different arrangement as shown in FIG. 10. The pixel electrodes 20 have substantially equal shapes. The shape of each of the pixel electrodes 20 may be the same as any of the pixel electrodes 20a or any of the pixel electrodes 20b of embodiments 1 to 4. The other elements are basically the same as those of embodiment 1. Therefore, only the arrangement pattern of the pixel electrodes 20 is described below.

FIG. 10 is a plan view showing an arrangement of the pixel electrodes 20 in a liquid crystal display device of embodiment 6. The pixels 10a to 10d shown in FIG. 10 represent four pixels 10 which are adjacent to one another in the liquid crystal display device of embodiment 6. The pixels 10a to 10d include pixel electrodes 20a to 20d, respectively.

As shown in FIG. 10, the pixel electrodes 20a and 20c which are side by side along the Y direction are arranged such that the positions of their edges in terms of the X direction (the positions of the right and left edges) are different by distance d5. Likewise, the pixel electrodes 20b and 20d which are side by side along the Y direction are arranged such that the positions of their edges in terms of the X direction are different by distance d5. Here, the length of the end portion of the branch portion 30 of the pixel electrode 20 along the X direction is preferably not more than 5.0 μm and not less than 1.5 μm. The length of the end portion of the slit 32 along the X direction is also preferably not more than 5.0 μm and not less than 1.5 μm. It is also preferred that distance d5 is approximately equal to length Er or length Es (not more than 5.0 μm and not less than 1.5 μm).

In this way, by arranging two pixel electrodes 20 which are side by side along the Y direction such that the positions of their edges in terms of the X direction are different, the end portions of the branch portions 30 of the pixel electrodes 20a and 20b face to the mouths of the slits 32 of the pixel electrodes 20c and 20d in the vicinity of the boundary between these pixel electrodes. This arrangement can effectively prevent occurrence of a leakage current between the pixel electrodes. Note that, in the present embodiment, the positions of the edges of two pixel electrodes which are side by side along the X direction (e.g., 20a and 20b) are equal in terms of the Y direction, although the positions of the edges of these pixel electrodes may be different in terms of the Y direction.

INDUSTRIAL APPLICABILITY

A liquid crystal display device of the present invention is suitably applicable to liquid crystal display devices for cell phones, PDAs, notebook PCs, display monitors, television receivers, etc.

REFERENCE SIGNS LIST 1 liquid crystal display device
10, 10a, 10b pixel
12 TFT
14 scan line
16 signal line
20, 20a, 20b, 20c, 20d pixel electrode
30, 30a, 30b, 30c, 30d branch portion
32, 32a, 32b, 32c, 32d slit
35a, 35b trunk portion
60 TFT substrate
62, 72 transparent substrate
64 gate insulation layer
66 insulation layer
67 resin layer
68, 78 alignment film
69, 79 polarizing plate
70 counter substrate
74 color filter layer
76 counter electrode
80 liquid crystal layer
110 pixel
112 boundary area
120 pixel electrode
130, 130a, 130b, 130c, 130d branch portion
135a, 135b trunk portion

The invention claimed is:

1. A liquid crystal display device that has a plurality of pixels which are arranged along a first direction and a second direction that is different from the first direction, the plurality of pixels including a first pixel and a second pixel which is adjacent to the first pixel along the first direction, the liquid crystal display device comprising:
a first substrate which includes a first electrode provided in the first pixel and a second electrode provided in the second pixel;
a second substrate which is arranged so as to oppose the first substrate, the second substrate including a counter electrode;
a liquid crystal layer interposed between the first substrate and the second substrate,
wherein the first electrode includes a plurality of first branch portions extending toward the second pixel,
the second electrode includes a plurality of second branch portions extending toward the first pixel,
some of the plurality of first branch portions have end portions directed toward an edge of the second electrode and, when viewed along the first direction, at least part of the end portions faces to a gap between end portions of two of the plurality of second branch portions;
a distance between an edge of the first electrode on the second electrode side and an edge of the second electrode on the first electrode side is not more than 5.0 μm, and
when viewed along the first direction, an end portion of one of the plurality of first branch portions overlaps an end portion of one of the plurality of second branch portions, and a length of the overlap along the second direction is not more than 2.5 μm.

2. The liquid crystal display device of claim 1, wherein some of the plurality of first branch portions have end portions directed toward an edge of the second electrode and, when viewed along the first direction, at least part of every one of the end portions faces to a gap between end portions of two of the plurality of second branch portions.

3. The liquid crystal display device of claim 1, wherein some of the plurality of first branch portions have end portions directed toward an edge of the second electrode and, when viewed along the first direction, an entirety of the end portions faces to a gap between end portions of two of the plurality of second branch portions.

4. The liquid crystal display device of claim 1, wherein the first electrode includes a first trunk portion extending in the first direction and a second trunk portion extending in the second direction, and the plurality of first branch portions extend from the first trunk portion or the second trunk portion.

5. The liquid crystal display device of claim 4, wherein the first electrode includes a plurality of third branch portions extending from the first trunk portion or the second trunk portion in a direction away from the second pixel, and
the first electrode has an asymmetric shape about the second trunk portion that is assumed as a symmetry axis.

6. The liquid crystal display device of claim 5, wherein the first electrode includes a plurality of fourth branch portions extending from the first trunk portion or the second trunk portion in a direction away from the second pixel and a plurality of fifth branch portions extending from the first trunk portion or the second trunk portion toward the second pixel in a direction different from the direction that the first branch portions extend, and
the first electrode has an asymmetric shape about the first trunk portion that is assumed as a symmetry axis.

7. The liquid crystal display device of claim 1, wherein the liquid crystal display device is a vertical alignment type liquid crystal display device,
the liquid crystal layer includes a liquid crystal of negative dielectric constant anisotropy, and
when a voltage is applied across the liquid crystal layer, a plurality of domains among which an alignment direction of the liquid crystal is different are formed according to a shape of the first electrode.

8. The liquid crystal display device of claim 1, wherein the plurality of first branch portions have first widths which are generally equal to one another, and
a space between any adjacent two of the plurality of first branch portions is equal to the first width.

9. The liquid crystal display device of claim 1, wherein the plurality of first branch portions have first widths which are generally equal to one another, and
a space between any adjacent two of the plurality of first branch portions is different from the first width.

10. The liquid crystal display device of claim 1, wherein a position of an edge of the first electrode in terms of the second direction and a position of an edge of the second electrode in terms of the second direction are different.

11. The liquid crystal display device of claim 1, wherein the first substrate includes a source bus line extending in the second direction, and
the first electrode and the second electrode are adjacent to each other with the intervention of the source bus line.

12. The liquid crystal display device of claim 1, wherein the plurality of pixels include a third pixel which is adjacent to the first pixel along the second direction,
the first substrate includes a third electrode which is provided in the third pixel, and
a position of an edge of the first electrode in terms of the first direction and a position of an edge of the third electrode in terms of the first direction are different.

13. The liquid crystal display device of claim 12, wherein the first substrate includes a gate bus line extending in the first direction, and
the first electrode and the third electrode are adjacent to each other with the intervention of the gate bus line.

* * * * *